(12) United States Patent
Minami et al.

(10) Patent No.: US 7,896,776 B2
(45) Date of Patent: Mar. 1, 2011

(54) GEAR CHANGE CONTROL DEVICE, STRADDLE-TYPE VEHICLE, AND METHOD OF CONTROLLING GEARBOX

(75) Inventors: Kengo Minami, Shizuoka (JP); Makoto Kosugi, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 560 days.

(21) Appl. No.: 12/036,081

(22) Filed: Feb. 22, 2008

(65) Prior Publication Data

US 2008/0207399 A1    Aug. 28, 2008

(30) Foreign Application Priority Data

Feb. 23, 2007 (JP) ............................. 2007-043645
Sep. 6, 2007 (JP) ............................. 2007-231135

(51) Int. Cl.
  *B60W 10/02* (2006.01)
  *B60W 10/04* (2006.01)
(52) U.S. Cl. ..................... 477/174; 477/176; 477/180
(58) Field of Classification Search ......... 477/174–176, 477/180
  See application file for complete search history.

(56) References Cited

U.S. PATENT DOCUMENTS 5,470,288 A * 11/1995 Palansky et al. ............ 477/110
6,014,604 A * 1/2000 Kuroiwa et al. ............... 701/54
6,846,269 B2 * 1/2005 Reuschel et al. ............ 477/110
7,286,922 B1 * 10/2007 Fischer et al. ................ 701/51
7,478,572 B2 * 1/2009 Maten et al. .................. 74/340
7,736,271 B2 * 6/2010 Minami ...................... 477/176
2010/0168970 A1 * 7/2010 Hasegawa et al. ............ 701/58

FOREIGN PATENT DOCUMENTS

JP    09-079373    3/1997

\* cited by examiner

*Primary Examiner*—Tisha D Lewis
(74) *Attorney, Agent, or Firm*—Rabin & Berdo, PC (57) ABSTRACT

Riding comfort of a vehicle is improved by reducing deceleration and acceleration exceeding the expectation of a rider due to gear changes. A gear change control device calculates current torque being transmitted from a drive-side member of a clutch to a driven-side member of the clutch, and calculates post-completion torque estimated to be transmitted from the drive-side member to the driven-side member after the completion of engagement of the clutch. The gear change control device then controls the degree of engagement of the clutch according to the difference between the current torque and the post-completion torque, and receives a next gear change command according to the difference between the current torque and the post-completion torque.

6 Claims, 7 Drawing Sheets

GEAR CHANGE CONTROL DEVICE, STRADDLE-TYPE VEHICLE, AND METHOD OF CONTROLLING GEARBOX

RELATED APPLICATIONS

This application claims the benefit of priority under 35 USC 119 of Japanese patent application no. 2007-043645, filed on Feb. 23, 2007, and Japanese patent application no. 2007-231135, filed on Sep. 6, 2007, which applications are hereby incorporated by reference in their entireties.

BACKGROUND OF THE INVENTION

1. Field of the Invention

The present invention relates to a technique for changing shift gears and engaging and disengaging a clutch using an actuator.

2. Description of Related Art

There have conventionally been vehicles that disengage a clutch and change shift gears by actuating an actuator according to a shift-up or a shift-down operation by a rider. In general, gear change control devices mounted on such vehicles start gradually engaging the clutch after the shift gears have completely been moved (changed).

The driver may occasionally make successive shift-up or shift-down operations in a short time while the vehicle is running. In order to respond to such quick gear change operations by the rider, the gear change control device disclosed in JP-B-3132358 allows the reception of a next gear change command even before the start of engagement of the clutch if the shift gears have completely been moved. When a next gear change command is inputted before the start of engagement of the clutch, this gear change control device does not engage the clutch but starts moving the shift gears according to the next gear change command while keeping the clutch disengaged. This gear change control device engages the clutch after the completion of the movement. This allows the rider to make quicker gear change operations than in the case where the reception of a next gear change command is started after the completion of engagement of the clutch.

However, the riding comfort of a vehicle provided with the gear change control device of JP-B-3132358 may be poor at gear changes. Specifically, when a next gear change command is inputted before the start of engagement of the clutch, the gear change control device of JP-B-3132358 changes the shift gears according to the next gear change command while keeping the clutch disengaged. Therefore, the shift gear corresponding to the gear change command inputted later is set without the rider sensing deceleration and acceleration at the shift gear corresponding to the gear change command inputted earlier at all. Therefore, deceleration and acceleration exceeding the expectation of the rider may occur when the shift gears are completely changed and the clutch is engaged, leading to poor riding comfort.

SUMMARY OF THE INVENTION

The present invention addresses the foregoing problem and provides a gear change control device for a straddle-type vehicle that improves riding comfort by reducing the occurrence of deceleration and acceleration exceeding the expectation of a rider due to successive gear changes.

The present invention is directed to a gear change control device including a clutch actuator for changing a degree of engagement of a clutch. A current torque obtaining section obtains torque transmitted from a drive-side member of the clutch to a downstream mechanism in a torque transmission path as current torque, the downstream mechanism including a driven-side member of the clutch. A post-completion torque obtaining section obtains torque estimated to be transmitted from the drive-side member to the downstream mechanism after completion of engagement of the clutch as post-completion torque. A control unit disengages the clutch by actuating the clutch actuator and changing shift gears in response to a gear change command by a rider, and then controls the degree of engagement of the clutch according to a difference between the current torque and the post-completion torque. The control unit receives a next gear change command according to the difference between the current torque and the post-completion torque.

The present invention is also directed to a straddle-type vehicle including the gear change control device.

The present invention is further directed to a method of controlling a gearbox, comprising: disengaging a clutch by actuating a clutch actuator and changing shift gears in response to a gear change command by a rider; obtaining torque transmitted from a drive-side member of the clutch to a downstream mechanism in a torque transmission path as current torque, the downstream mechanism including a driven-side member of the clutch; obtaining torque estimated to be transmitted from the drive-side member to the downstream mechanism after completion of engagement of the clutch as post-completion torque; controlling a degree of engagement of the clutch according to a difference between the current torque and the post-completion torque; and starting to receive a next gear change command according to the difference between the current torque and the post-completion torque.

The present invention allows the rider to sense deceleration and acceleration that will occur after completion of engagement of the clutch, even before the clutch is completely engaged. The next gear change command can then be received after the rider senses deceleration or acceleration at the shift gear corresponding to the first gear change command. As a result, riding comfort is improved by reducing the occurrence of deceleration and acceleration exceeding the expectation of the rider due to successive gear changes. The straddle-type vehicle may be a motorcycle (including a scooter), a four-wheeled buggy, a snowmobile or a two-wheeled electric vehicle, for example.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 8(a)-8(d) are time charts showing the results of processing executed by the control unit, wherein

DETAILED DESCRIPTION OF THE INVENTION

Figure 1:
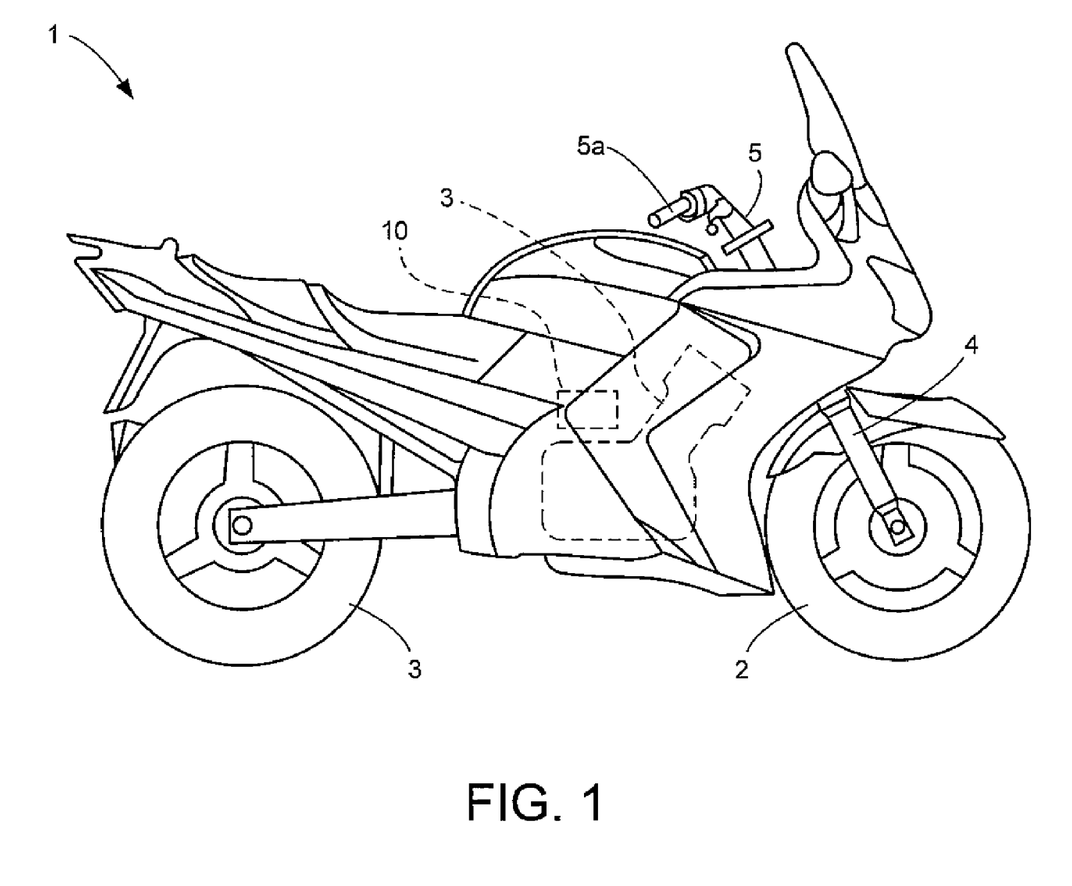
FIG. 1 is a side view of a motorcycle provided with a gear change control device according to an embodiment of the present invention.

An embodiment of the present invention is described below with reference to the drawings. FIG. 1 is a side view of a motorcycle 1 provided with a gear change control device 10 according to an exemplary embodiment of the present invention.

Figure 2:
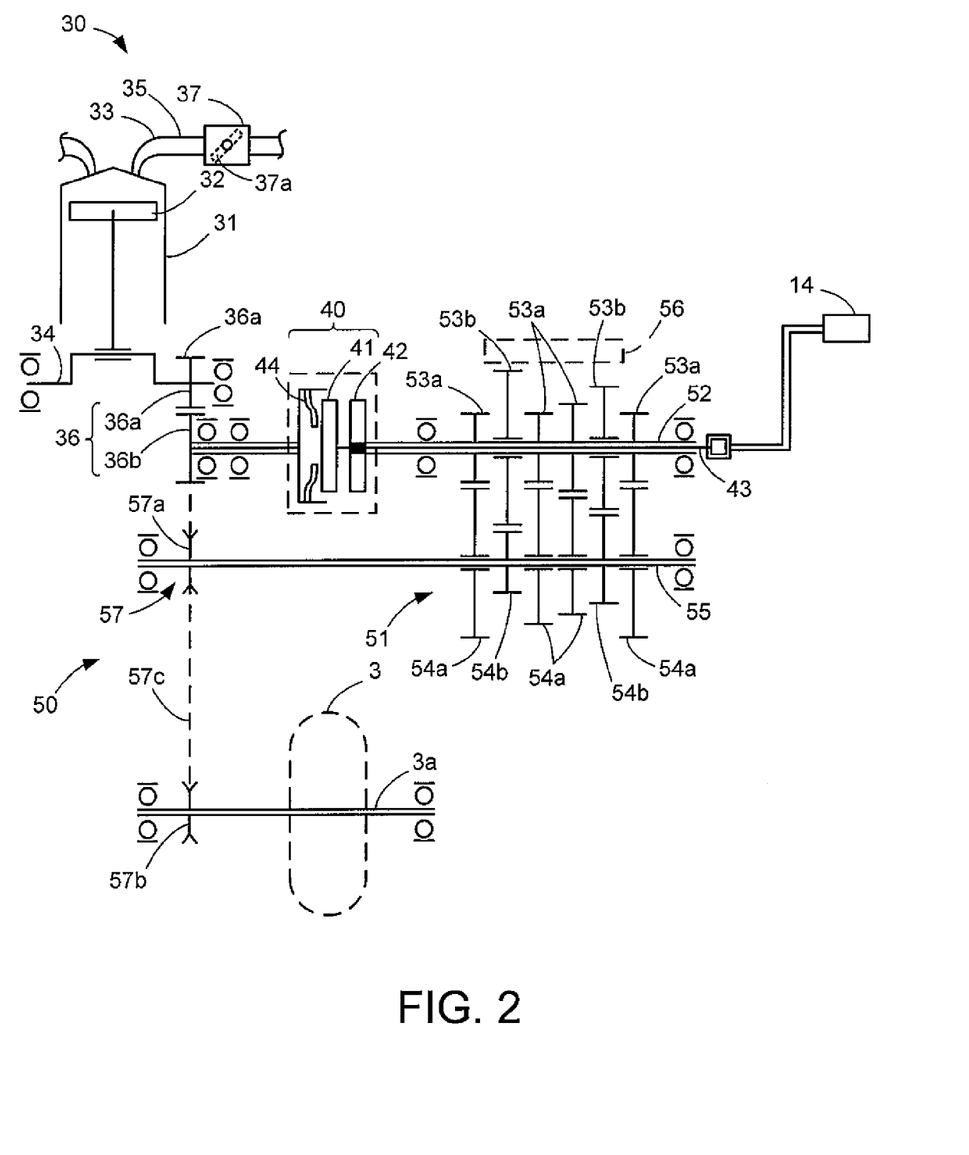
FIG. 2 is a schematic diagram of a mechanism located on a torque transmission path of the motorcycle.

FIG. 2 is a schematic view of a mechanism located on a torque transmission path of motorcycle 1.

As shown in FIGS. 1 and 2, in addition to gear change control device 10, motorcycle 1 comprises an engine 30, a primary speed reducing mechanism 36, a clutch 40, a secondary speed reducing mechanism 50, a front wheel 2 and a rear wheel 3.

Front wheel 2 is supported by a lower end of a front fork 4, and handlebars 5 are connected to the top of front fork 4. An accelerator grip 5a mounted to a right end of handlebars 5 is connected to a throttle valve 37a provided in a throttle body 37 (FIG. 2). Throttle valve 37a is opened according to a rider's accelerator operation, and a certain amount of air, which depends on the opening of throttle valve 37a, is delivered to engine 30. Motorcycle 1 may be provided with an electronically-controlled throttle device. In this case, there are provided a sensor for detecting a rider's accelerator operation and an actuator for rotating throttle valve 37a according to the accelerator operation detected by the sensor.

As shown in FIG. 2, engine 30 has a cylinder 31, a piston 32, an intake port 33 and a crankshaft 34. Throttle body 37 is connected to intake port 33 via an intake pipe 35.

Throttle valve 37a is placed in an intake passage of throttle body 37. A mixture of air, which flows through the intake passage of throttle body 37, and fuel, which is supplied from a fuel supply device (for example, an injector or carburetor), is delivered to an interior of cylinder 31. Burning the air-fuel mixture causes piston 32 to reciprocate within cylinder 31. Reciprocating motion of piston 32 is converted into rotating motion by crankshaft 34, thereby outputting torque from engine 30.

Primary speed reducing mechanism 36 includes a drive-side primary reduction gear 36a that operates in conjunction with crankshaft 34; and a driven-side primary reduction gear 36b that meshes with primary reduction gear 36a. Primary speed reducing mechanism 36 decelerates rotation of crankshaft 34 according to a gear ratio between these gears.

Clutch 40 transmits and shuts off torque outputted from engine 30 to the downstream side in the torque transmission path. Clutch 40 is a friction clutch, for example, and is provided with a drive-side member 41 and a driven-side member 42. Drive-side member 41 includes a friction disk, for example, and rotates together with primary reduction gear 36b. Driven-side member 42 includes a clutch disk, for example, and rotates together with a main shaft 52. Drive-side member 41 and driven-side member 42 are pressed against each other by elastic force of a clutch spring 44 at the time of engaging clutch 40, so that the torque of engine 30 is transmitted from drive-side member 41 to driven-side member 42. Also, when clutch 40 is disengaged, driven-side member 42 is moved away from drive-side member 41, so that torque transmission from drive-side member 41 is interrupted. Gear change control device 10 is provided with a clutch actuator 14 to be discussed later. Clutch actuator 14 performs engaging operation of clutch 40 (switching clutch 40 from the disengaged state to the engaged state) and disengaging operation thereof (switching clutch 40 from the engaged state to the disengaged state).

Secondary speed reducing mechanism 50 decelerates rotation of main shaft 52 and transmits the decelerated rotation to an axle 3a of rear wheel 3. Secondary speed reducing mechanism 50 is provided with a gearbox 51 and a transmission mechanism 57. Gearbox 51 is a mechanism to change deceleration ratios, such as a constant-mesh gearbox and a selective-sliding gearbox.

Gearbox 51 has plural shift gears 53a (for example, first-speed, second-speed, third/fourth-speed gears) and shift gears 53b (for example, fifth-speed and sixth-speed gears) on main shaft 52. Gearbox 51 also has plural shift gears 54a (for example, first-speed, second-speed, third/fourth-speed gears) and shift gears 54b (for example, fifth-speed and sixth-speed gears) on a countershaft 55. Shift gears 53a are spline-connected to and operate in conjunction with main shaft 52. Shift gears 54a run idle with respect to countershaft 55 and mesh with shift gears 53a. Shift gears 53b run idle with respect to main shaft 52. Shift gears 54b mesh with corresponding shift gears 53b and are spline-connected to and operate in conjunction with countershaft 55.

Gearbox 51 also comprises a gearshift mechanism 56. Gearshift mechanism 56 includes a shift fork and a shift drum, for example, and selectively moves shift gears 53a, 53b, 54a, 54b in the axial direction of main shaft 52 or countershaft 55. Then, gearshift mechanism 56 causes shift gears 53b, 54a, which run idle with respect to the corresponding shafts, to connect with adjacent shift gears 53a, 54b, which operate in conjunction with the corresponding shafts. This changes shift gears 53a, 53b, 54a, 54b to transmit torque from main shaft 52 to countershaft 55. Gearshift mechanism 56 is actuated by power inputted from a shift actuator 16.

Transmission mechanism 57 decelerates rotation of countershaft 55 and transmits the decelerated rotation to axle 3a of rear wheel 3. Transmission mechanism 57 includes a drive-side member 57a (for example, a drive-side sprocket) that operates in conjunction with countershaft 55; a driven-side member 57b (for example, a driven-side sprocket) that operates in conjunction with axle 3a; and a transmission member 57c (for example, a chain) that transmits torque from drive-side member 57a to driven-side member 57b.

Torque outputted from engine 30 is transmitted to drive-side member 41 of clutch 40 via primary speed reducing mechanism 36. Torque transmitted to drive-side member 41 is transmitted to axle 3a of rear wheel 3 via driven-side member 42, gearbox 51, and transmission mechanism 57, when clutch 40 is engaged or when drive-side member 41 and driven-side member 42 contact each other, that is, when clutch 40 is in a half-clutch state.

Figure 3:
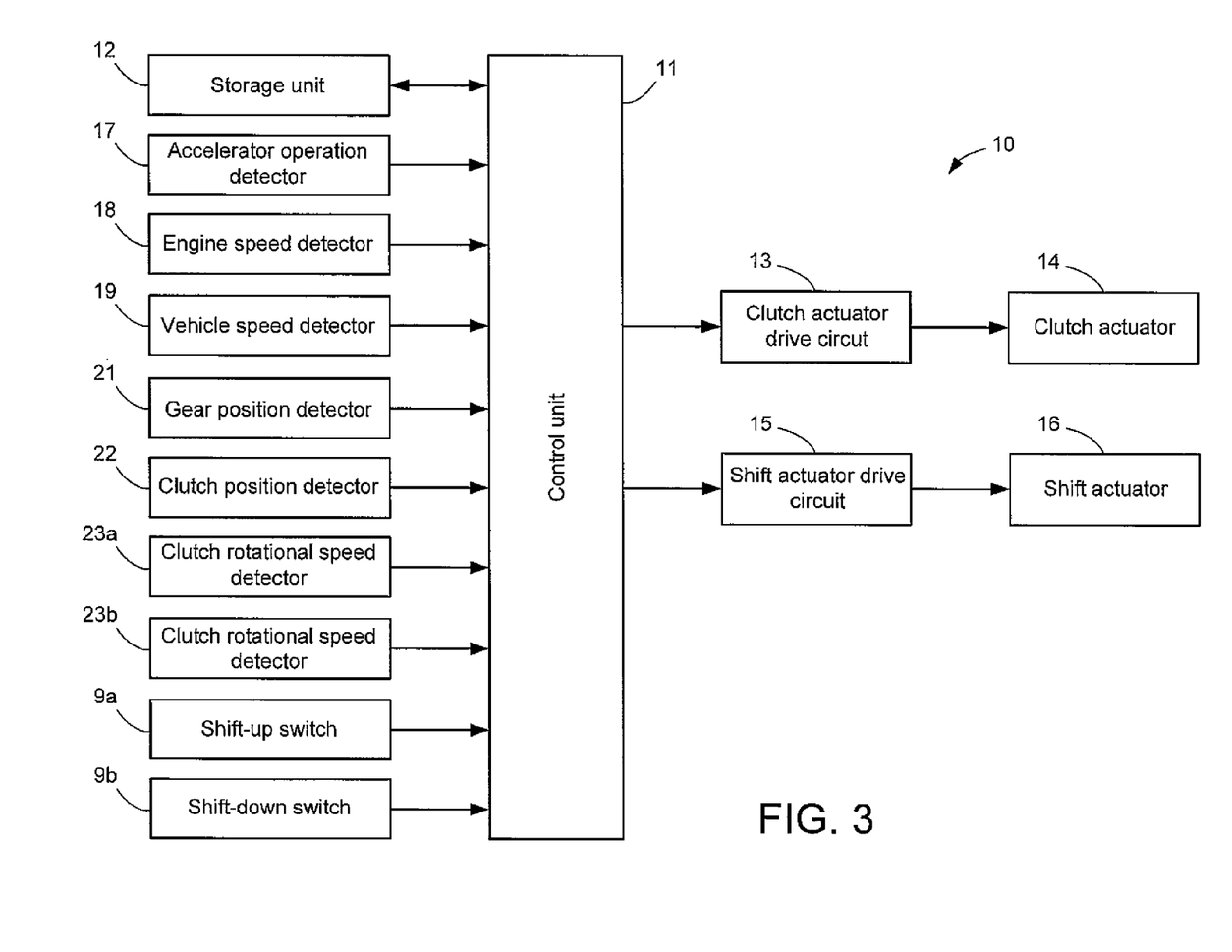
FIG. 3 is a block diagram of the gear change control device.

The configuration of gear change control device 10 is now described. Motorcycle 1 is a semi-automatic vehicle that changes the shift gears of gearbox 51 without the need for the rider to operate the clutch. Gear change control device 10 controls the degree of engagement of clutch 40 (relative positions of drive-side member 41 and driven-side member 42), and changes shift gears 53a, 53b, 54a, 54b. FIG. 3 is a block diagram of gear change control device 10. As shown in FIG. 3, gear change control device 10 comprises a control unit 11, a storage unit 12, a clutch actuator drive circuit 13, a clutch actuator 14, a shift actuator drive circuit 15, a shift actuator 16, an accelerator operation detector 17, an engine speed detector 18, a vehicle speed detector 19, a gear position detector 21, a clutch position detector 22 and clutch rotational speed detectors 23a, 23b. Control unit 11 is connected to a shift-up switch 9a and a shift-down switch 9b.

Control unit 11 includes a central processing unit (CPU), and controls the degree of engagement of clutch 40 and the speed reduction ratios of gearbox 51 in accordance with programs stored in storage unit 12 in response to a gear change operation by the rider (in this example, operation to turn on shift-up switch 9a or shift-down switch 9b).

Storage unit 12 includes a nonvolatile memory and a volatile memory. Storage unit 12 stores in advance programs executed by control unit 11 and tables and expressions used in the processing executed by control unit 11.

Clutch actuator drive circuit 13 supplies drive voltage or drive current to clutch actuator 14 in accordance with a control signal inputted from control unit 11. Clutch actuator 14 includes, for example, a motor and a power transmission mechanism (such as hydraulic path or wire), and is driven by electric power supplied from clutch actuator drive circuit 13. In this example, clutch actuator 14 presses a push rod 43 and releases the pressed push rod 43. When push rod 43 is pressed by clutch actuator 14, push rod 43 moves drive-side member 41 and driven-side member 42 away from each other against the elastic force of clutch spring 44, so that clutch 40 is disengaged. In contrast, when the pressed push rod 43 is released by clutch actuator 14, push rod 43 returns to its original position (the position at the time when clutch 40 is engaged) using the elastic force of clutch spring 44. Thus, drive-side member 41 and driven-side member 42 approach each other, so that clutch 40 is engaged. In addition, clutch actuator 14 brings clutch 40 into a half-clutch state during engaging operation of clutch 40. When clutch 40 is in a half-clutch state, only part of the torque of engine 30 is transmitted from drive-side member 41 to driven-side member 42.

Shift actuator drive circuit 15 supplies drive voltage or drive current to shift actuator 16 in accordance with a control signal inputted from control unit 11. Shift actuator 16 includes, for example, a motor and a power transmission mechanism (such as hydraulic path or wire), and is actuated by driving power outputted from shift actuator drive circuit 15. Shift actuator 16 actuates gearshift mechanism 56 to change shift gears 53a, 53b, 54a, 54b to transmit torque from main shaft 52 to countershaft 55, in order to change the deceleration ratios.

Accelerator operation detector 17 detects the amount of an accelerator operation by the rider (hereinafter referred to as accelerator displacement (for example, throttle opening)). Examples of accelerator operation detector 17 are a throttle position sensor for detecting the throttle opening and an accelerator position sensor mounted to accelerator grip 5a to detect the rotation angle of accelerator grip 5a. Control unit 11 detects accelerator displacement by the rider based on a signal outputted from accelerator operation detector 17.

Engine speed detector 18 detects rotational speed of engine 30 (hereinafter referred to as engine speed). Examples of engine speed detector 18 are a crank angle sensor for outputting a pulse signal with a frequency according to the rotational speed of crankshaft 34 or primary reduction gears 36a, 36b and a tachogenerator for outputting a voltage signal according to the rotational speed thereof. Control unit 11 calculates engine speed based on a signal inputted from engine speed detector 18.

Vehicle speed detector 19 detects vehicle speed, and outputs a signal to control unit 11 according to, for example, the rotational speed of axle 3a of rear wheel 3 or that of countershaft 55. Control unit 11 calculates the vehicle speed based on the signal. Vehicle speed detector 19 may output a signal according to the rotational speed of main shaft 52. In this case, control unit 11 calculates vehicle speed not only based on the input signal, but also based on the deceleration ratio of gearbox 51 and that of transmission mechanism 57.

Gear position detector 21 detects the positions of shift gears 53a, 53b, 54a, 54b provided movably in the axial direction of countershaft 55 or main shaft 52. An example of gear position detector 21 is a potentiometer mounted to gearshift mechanism 56 or shift actuator 16. Gear position detector 21 outputs a signal to control unit 11 according to positions of shift gears 53a, 53b, 54a, 54b. Based on the input signal, control unit 11 detects that movements of shift gears 53a, 53b, 54a, 54b that are associated with the gear change have been completed.

Clutch position detector 22 detects the degree of engagement of clutch 40. Examples of clutch position detector 22 are a potentiometer for outputting a signal according to the position of push rod 43 and a potentiometer for outputting a signal according to the position or rotation angle of the output shaft of clutch actuator 14. Control unit 11 detects the degree of engagement of clutch 40 based on the signal inputted from clutch position detector 22.

Clutch rotational speed detector 23a detects the rotational speed of drive-side member 41 of clutch 40. Examples of clutch rotational speed detector 23a are a rotary encoder for outputting a pulse signal with a frequency according to the rotational speed of drive-side member 41 and a tachogenerator for outputting a voltage signal according to the rotational speed of drive-side member 41. Also, clutch rotational speed detector 23b detects the rotational speed of driven-side member 42 of clutch 40. Examples of clutch rotational speed detector 23b are a rotary encoder and a tachogenerator similar to those for clutch rotational speed detector 23a.

Shift-up switch 9a and shift-down switch 9b allow the rider to give gear change control device 10 a command to change speed reduction ratios of gearbox 51. Switches 9a, 9b output a signal to control unit 11 according to the gear change command. Control unit 11 actuates shift actuator 16 according to the input signal to change shift gears 53a, 53b, 54a, 54b to transmit torque from main shaft 52 to countershaft 55. Shift-up switch 9a and shift-down switch 9b are provided adjacent to accelerator grip 5a, for example.

The processing executed by control unit 11 is now described. When a signal indicating a gear change command by the rider is inputted from shift-up switch 9a or shift-down switch 9b, control unit 11 disengages clutch 40 and moves shift gears 53a, 53b, 54a, 54b. Then, control unit 11 gradually engages clutch 40 after shift gears 53a, 53b, 54a, 54b have completely been moved. In the example described herein, during engaging operation of clutch 40, control unit 11 calculates torque Tpre (hereinafter referred to as current transmission torque) currently being transmitted from drive-side member 41 to a downstream mechanism in the torque transmission path including driven-side member 42, such as driven-side member 42, secondary speed reducing mechanism 50 and axle 3a. Also, control unit 11 calculates torque Tfin (hereinafter referred to as post-completion transmission torque) estimated to be transmitted from drive-side member 41 to the downstream mechanism after completion of engagement of clutch 40 (when engaging operation of clutch 40 is finished). Control unit 11 then controls the degree of engagement of clutch 40 during engaging operation thereof based on the calculated current transmission torque Tpre and the calculated post-completion transmission torque Tfin.

Control unit 11 receives a next gear change command according to the difference between current transmission torque Tpre and post-completion transmission torque Tfin, even during engaging operation of clutch 40. When a next gear change command is received during engaging operation of clutch 40, control unit 11 does not complete gear change control corresponding to the gear change command inputted earlier, but disengages clutch 40 again, moves shift gears 53a, 53b, 54a, 54b, and then engages clutch 40 again according to the gear change command inputted later. The processing executed by control unit 11 is discussed in detail below.

Figure 4:
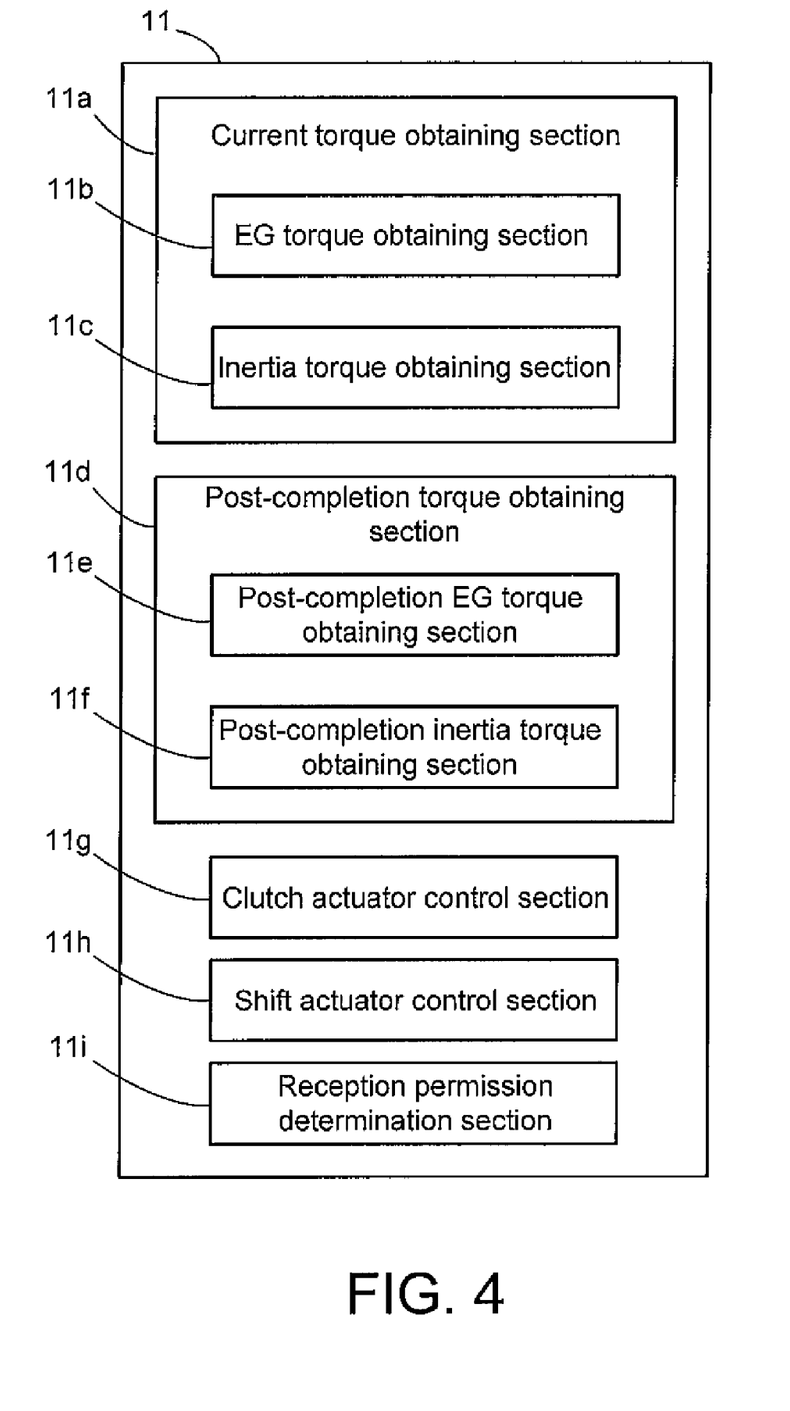
FIG. 4 is a functional block diagram of a control unit provided in the gear change control device.

FIG. 4 is a functional block diagram of processing executed by control unit 11. As shown in FIG. 4, control unit 11 includes a current torque obtaining section 11a, a post-completion torque obtaining section 11d, a clutch actuator control section 11g, a shift actuator control section 11h and a reception permission determination section 11i. Current torque obtaining section 11a includes an EG torque obtaining section 11b and an inertia torque obtaining section 11c, and post-completion torque obtaining section 11d includes a post-completion EG torque obtaining section 11e and a post-completion inertia torque obtaining section 11f.

Current torque obtaining section 11a is first described. Current torque obtaining section 11a executes processing for obtaining current transmission torque Tpre. Specifically, current torque obtaining section 11a calculates current transmission torque Tpre based on torque TEpre currently being outputted from engine 30 (hereinafter referred to as EG torque) and based on inertia torque TIpre (hereinafter referred to as inertia torque) produced in a mechanism upstream of drive-side member 41 in the torque transmission path, such as crankshaft 34, piston 32 and primary speed reducing mechanism 36. Current torque obtaining section 11a executes this processing in a preset sampling cycle (for example, several milliseconds) during engaging operation of clutch 40. Current transmission torque Tpre is described herein as torque being transmitted to driven-side member 42 in the downstream mechanism described above.

The processing for obtaining EG torque TEpre is first described. Storage unit 12 stores in advance a table (hereinafter referred to as EG torque table) that correlates EG torque TEpre with engine speed and accelerator displacement. Then, EG torque obtaining section 11b detects accelerator displacement based on the signal inputted from accelerator operation detector 17, and detects engine speed based on the signal inputted from engine speed detector 18. EG torque obtaining section 11b then refers to the EG torque table to obtain EG torque TEpre corresponding to the detected accelerator displacement and detected engine speed.

In place of the EG torque table, storage unit 12 may store in advance an expression (hereinafter referred to as EG torque relational expression) that defines the relationship among engine speed, accelerator displacement, and EG torque TEpre. In this case, EG torque obtaining section 11b substitutes the detected engine speed and detected accelerator displacement into the EG torque relational expression to calculate EG torque TEpre.

Alternatively, EG torque obtaining section 11b may obtain EG torque TEpre based on the pressure of air (hereinafter referred to as intake pressure) flowing through the interior of intake pipe 35. For example, storage unit 12 may store a table that correlates EG torque TEpre with intake pressure and engine speed. In addition, a pressure sensor for outputting a signal according to the intake pressure is disposed in intake pipe 35. In this case, EG torque obtaining section 11b detects engine speed, and intake pressure based on the signal inputted from the pressure sensor, at the time when the crank angle becomes a predetermined value (for example, at the end of intake stroke). EG torque obtaining section 11b then refers to the table stored in storage unit 12 to obtain EG torque TEpre corresponding to the detected intake pressure and detected engine speed.

Inertia torque TIpre is determined according to the variation in engine speed $\Omega e$ per unit time ($d\Omega e/dt$, hereinafter referred to as rate-of-change of EG speed). Storage unit 12 stores in advance an expression that associates inertia torque TIpre and the rate-of-change of EG speed ($d\Omega e/dt$). Specifically, storage unit 12 stores an expression that defines inertia torque TIpre as a value ($I \times (d\Omega e/dt)$) obtained by multiplying the inertial moment I of the mechanism upstream of drive-side member 41 by the rate-of-change of EG speed ($d\Omega e/dt$). In this case, inertia torque obtaining section 11c calculates the rate-of-change of EG speed ($d\Omega e/dt$) based on the signal inputted from engine speed detector 18. Inertia torque obtaining section 11c then multiplies the rate-of-change of EG speed ($d\Omega e/dt$) by inertial moment I of the mechanism upstream of drive-side member 41 (hereinafter simply referred to as inertial moment), and defines the multiplication result ($I \times (d\Omega e/dt)$) as inertia torque TIpre. Storage unit 12 may store a table that correlates the rate-of-change of EG speed ($d\Omega e/dt$) and inertia torque TIpre. In this case, inertia torque obtaining section 11c refers to the table to obtain inertia torque TIpre corresponding to the rate-of-change of EG speed ($d\Omega e/dt$).

As described above, current torque obtaining section 11a obtains current transmission torque Tpre based on EG torque TEpre and inertia torque TIpre. For example, storage unit 12 may store in advance an expression that defines the relationship among current transmission torque Tpre, EG torque TEpre, and inertia torque TIpre, and current torque obtaining section 11a may substitute EG transmission torque TEpre and inertia torque TIpre obtained by the processing described above into the expression, in order to calculate current transmission torque Tpre. For example, storage unit 12 may store the following expression (1):

$$Tpre = (TEpre - TIpre) \times Pratio \quad (1)$$

where Pratio is the gear ratio of primary speed reducing mechanism 36 (Pratio=the number of teeth of driven-side primary reduction gear 36b/the number of teeth of drive-side primary reduction gear 36a).

The processing for calculating current transmission torque Tpre is not limited to the aforementioned processing. For example, storage unit 12 may store a table or an expression that correlates current transmission torque Tpre with engine speed, accelerator displacement, and the rate-of-change of EG speed. In this case, current torque obtaining section 11a can use the table or expression to directly obtain current transmission torque Tpre from engine speed, the rate-of-change of EG speed, and accelerator displacement.

The processing executed by post-completion torque obtaining section 11d is now described. Post-completion torque obtaining section 11d executes processing for obtaining post-completion transmission torque Tfin described above. Specifically, post-completion torque obtaining section 11d obtains post-completion transmission torque Tfin based on torque TEfin (hereinafter referred to as post-completion EG torque) estimated to be outputted from engine 30 after completion of engagement of clutch 40 and inertia torque TIfin (hereinafter referred to as post-completion inertia torque) estimated to be produced in the mechanism upstream of drive-side member 41 in the torque transmission path after completion of clutch engagement.

The processing for estimating post-completion EG torque TEfin is first described. Post-completion EG torque obtaining section 11e estimates engine speed after completion of clutch engagement based on the rotational speed of driven-side member 42 or a mechanism downstream of driven-side member 42. Post-completion EG torque obtaining section 11e then estimates post-completion EG torque TEfin based on the estimated engine speed and based on accelerator displacement.

For example, post-completion EG torque obtaining section 11e detects the current rotational speed of driven-side member 42 and the rotational speed of drive-side member 41, in order to calculate the difference in rotational speed between these members (hereinafter referred to as clutch rotational speed difference Ωdiff). Post-completion EG torque obtaining section 11e also calculates current engine speed Ωe. Then, post-completion EG torque obtaining section 11e substitutes the calculated clutch rotational speed difference Ωdiff and the calculated engine speed Ωe into the expression stored in advance in storage unit 12, to define the obtained value as engine speed Ωfin after completion of clutch engagement. For example, post-completion EG torque obtaining section 11e may substitute the current clutch rotational speed difference Ωdiff and engine speed Ωe into the following expression (2), to define the obtained value as engine speed Ωfin after completion of clutch engagement.

$$\Omega\text{fin} = \Omega e - (\Omega\text{diff} \times P\text{ratio}) \qquad (2)$$

Post-completion EG torque obtaining section 11e also detects accelerator displacement based on the signal inputted from accelerator operation detector 17. Post-completion EG torque obtaining section 11e then defines torque corresponding to engine speed Ωfin and accelerator displacement as post-completion EG torque TEfin using, for example, the EG torque table described above.

The processing for estimating post-completion inertia torque TIfin is now described. Post-completion inertia torque obtaining section 11f estimates post-completion inertia torque TIfin based on the current rate-of-change of rotational speed (variation in rotational speed per unit time, hereinafter referred to as rate-of-change of rotational speed) of the mechanism provided downstream of drive-side member 41 in the torque transmission path, such as driven-side member 42, countershaft 55, and axle 3a.

The processing for estimating post-completion inertia torque TIfin is described herein using driven-side member 42 in the mechanism downstream of drive-side member 41 as an example. Post-completion inertia torque obtaining section 11f calculates the current rate-of-change of rotational speed (dΩcl/dt) of driven-side member 42. Then, post-completion inertia torque obtaining section 11f substitutes the calculated rate-of-change of rotational speed (dΩcl/dt) of driven-side member 42 into the following expression (3), for example, to calculate post-completion inertia torque TIfin.

$$T\text{Ifin} = I \times (d\Omega cl/dt) \times P\text{ratio} \qquad (3)$$

Storage unit 12 stores in advance an expression that defines the relationship between the rate-of-change of rotational speed (dΩcl/dt) and post-completion inertia torque TIfin.

Post-completion inertia torque obtaining section 11f may estimate post-completion inertia torque TIfin based on the rate-of-change of rotational speed of a component such as countershaft 55 or axis 3a rather than based on the rate-of-change of rotational speed (dΩcl/dt) of driven-side member 42. In this case, post-completion inertia torque obtaining section 11f multiplies the rate-of-change of rotational speed of such a component by the gear ratio of the mechanism located between the component and engine 30 (for example, the gear ratio of gearbox 51 and the gear ratio of primary speed reducing mechanism 36 after completion of engagement of clutch 40), in order to calculate post-completion inertia torque TIfin.

Post-completion inertia torque obtaining section 11f calculates the rate-of-change of rotational speed (dΩcl/dt) of driven-side member 42 by the processing described above in a predetermined sampling cycle during engaging operation of clutch 40, in order to sequentially calculate post-completion inertia torque TIfin based on the calculated rate-of-change of rotational speed (dΩcl/dt). Alternatively, post-completion inertia torque obtaining section 11f may continuously use the rate-of-change of rotational speed (dΩcl/dt) calculated immediately before clutch 40 is disengaged (for example, several hundred milliseconds before clutch 40 starts being disengaged) in the processing executed by clutch actuator control section 11g, rather than calculating the rate-of-change of rotational speed (dΩcl/dt) in a predetermined sampling cycle. The processing executed by clutch actuator control section 11g will be discussed later.

The processing for calculating post-completion transmission torque Tfin is now described. Post-completion torque obtaining section 11d substitutes post-completion EG torque TEfin and post-completion inertia torque TIfin calculated as described above into an expression that defines the relationship between these torques and post-completion transmission torque Tfin, in order to calculate post-completion transmission torque Tfin. For example, post-completion torque obtaining section 11d substitutes post-completion EG torque TEfin and post-completion inertia torque TIfin into the following expression (4) to calculate post-completion transmission torque Tfin.

$$T\text{fin} = (TE\text{fin} - TI\text{fin}) \times P\text{ratio} \qquad (4)$$

Post-completion torque obtaining section 11d may calculate post-completion transmission torque Tfin based on the calculation result of expression (4) and a preset correction value. For example, post-completion torque obtaining section 11d may define the value obtained by multiplying (TEfin−TIfin)×Pratio in expression (4) by a correction value k as post-completion transmission torque Tfin. For example, correction value k is determined according to accelerator displacement by the rider, and set so as to increase in proportion to accelerator displacement.

The processing executed by clutch actuator control section 11g is now described. Clutch actuator control section 11g actuates clutch actuator 14 to control the degree of engagement of clutch 40 based on current transmission torque Tpre obtained by current torque obtaining section 11a and post-completion transmission torque Tfin estimated by post-completion torque obtaining section 11d. Clutch actuator control section 11g executes the following processing, for example.

Storage unit 12 stores in advance an expression (hereinafter referred to as actuation amount relational expression) that defines the relationship between the difference (hereinafter referred to as torque deviation) between current transmission torque Tpre and post-completion transmission torque Tfin and the actuation amount of clutch actuator 14. Clutch actuator control section 11g calculates the torque deviation (Tfin−Tpre) every time current torque obtaining section 11a calculates current transmission torque Tpre. Clutch actuator control section 11g then substitutes the torque deviation (Tfin−Tpre) into the actuation amount relational expression in order to calculate the amount by which clutch actuator 14 is to be actuated (hereinafter referred to as command actuation amount) and outputs a control signal to clutch actuator drive circuit 13 according to the command actuation amount. Clutch actuator drive circuit 13 supplies driving power to clutch actuator 14 according to the input control signal.

Figure 5:
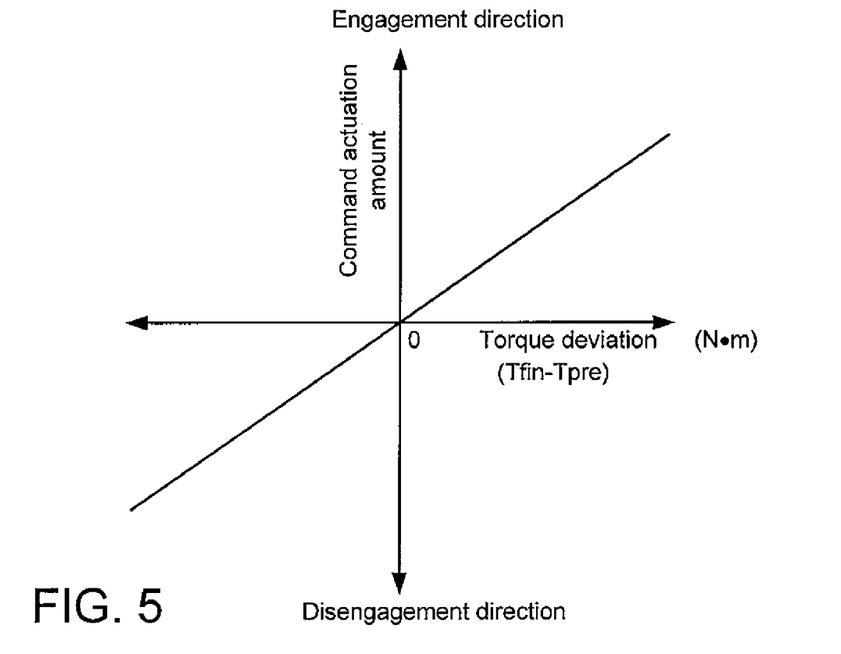
FIG. 5 is a graph showing the relationship between the difference between post-completion transmission torque and current transmission torque and a command actuation amount obtained using an actuation amount relational expression.

FIG. 5 is a graph showing the relationship between the torque deviation (Tfin−Tpre) and the command actuation amount obtained from the actuation amount relational expression. In FIG. 5, the actuation amount relational expression is established such that if the torque deviation (Tfin−Tpre) is positive, clutch actuator 14 is actuated in the direction to engage clutch 40. In contrast, the actuation amount relational expression is established such that if the torque deviation (Tfin−Tpre) is negative, clutch actuator 14 is actuated in the direction to disengage clutch 40. In addition, the actuation amount relational expression is established such that the command actuation amount increases in proportion to the torque deviation (Tfin−Tpre).

Figure 6:
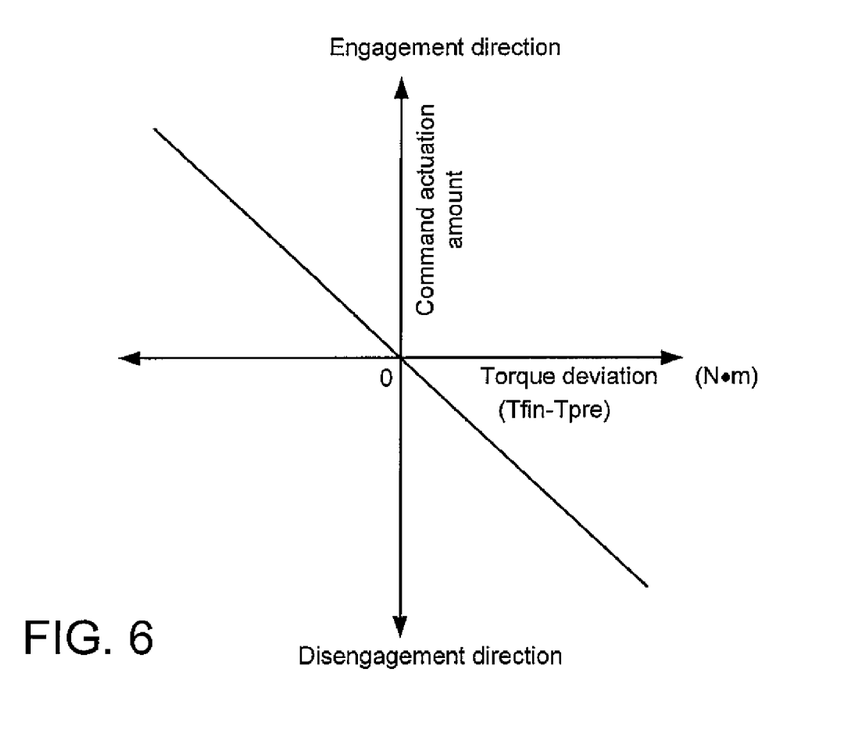
FIG. 6 is a graph showing the relationship between the difference between post-completion transmission torque and current transmission torque and a command actuation amount obtained using a disengagement actuation amount relational expression.

Storage unit 12 stores two actuation amount relational expressions. One expression (hereinafter referred to as engagement actuation amount relational expression) is to actuate clutch actuator 14 in the direction to engage clutch 40 when the torque deviation (Tfin−Tpre) is positive as shown in FIG. 5. The other expression (hereinafter referred to as disengagement actuation amount relational expression) is to actuate clutch actuator 14 in the direction to disengage clutch 40. FIG. 6 is a graph showing the relationship between the torque deviation (Tfin−Tpre) and the command actuation amount obtained from the disengagement actuation amount relational expression. In FIG. 6, the actuation amount relational expression is established such that if the torque deviation (Tfin−Tpre) is positive, clutch actuator 14 is actuated in the direction to disengage clutch 40, in contrast to the graph shown in FIG. 5.

Clutch actuator control section 11g selects either the engagement or disengagement actuation amount relational expression depending on whether the clutch rotational speed difference is positive or negative. Specifically, if the clutch rotational speed difference is positive, clutch actuator control section 11g selects the engagement actuation amount relational expression to substitute the torque deviation (Tfin−Tpre) into the engagement actuation amount relational expression. On the contrary, if the clutch rotational speed difference is negative, clutch actuator control section 11g selects the disengagement actuation amount relational expression to substitute the torque deviation (Tfin−Tpre) into the disengagement actuation amount relational expression.

By allowing clutch actuator control section 11g to selectively use the engagement and disengagement actuation amount relational expressions depending on the clutch rotational speed difference, an engine brake can be applied on a downhill slope, for example. For example, as a result of accelerator displacement being set to zero on a downhill slope, the post-completion transmission torque Tfin is occasionally negative. At this time, if clutch 40 is disengaged, current transmission torque Tpre is zero, and therefore the torque deviation (Tfin−Tpre), which is the difference between post-completion transmission torque Tfin and current transmission torque Tpre, is negative. Also, when the rotational speed of driven-side member 42 is faster than that of drive-side member 41, the disengagement actuation amount relational expression is selected. As a result, the command actuation amount corresponding to the torque deviation (Tfin−Tpre) is a value in the direction to engage clutch 40, thereby applying an engine brake.

Alternatively, in place of the engagement and disengagement actuation amount relational expressions, storage unit 12 may store a table that correlates the command actuation amount with post-completion transmission torque Tfin and current transmission torque Tpre. In this case, clutch actuator control section 11g refers to the table to directly obtain the command actuation amount corresponding to post-completion transmission torque Tfin and current transmission torque Tpre, without calculating the difference between post-completion transmission torque Tfin and current transmission torque Tpre.

When a gear change command is inputted in the state where execution of gear change control is permitted in the processing executed by reception permission determination section 11i, clutch actuator control section 11g first disengages clutch 40 to temporarily interrupt torque transmission from drive-side member 41 to driven-side member 42. The processing executed, by reception permission determination section 11i will be discussed later. After that, clutch actuator control section 11g detects that some shift gears 53a, 53b, 54a, 54b corresponding to the gear change command have completely been moved based on the signal inputted from gear position detector 21, and then starts the aforementioned control to engage clutch 40.

The processing executed by shift actuator control section 11h is now described. When a gear change command by the rider is inputted in the state where execution of gear change control is permitted in the processing executed by reception permission determination section 11i, shift actuator control section 11h actuates shift actuator 16 to change shift gears 53a, 53b, 54a, 54b. The processing executed by reception permission determination section 11i will be discussed later. Specifically, after detecting that clutch 40 has been disengaged based on the signal inputted from clutch position detector 22, shift actuator control section 11h outputs a control signal to shift actuator drive circuit 15 according to the gear change command. Shift actuator 16 is actuated by driving power supplied from shift actuator drive circuit 15 according to the control signal in order to move some of the shift gears 53a, 53b, 54a, 54b.

The processing executed by reception permission determination section 11i is now described. When a next gear change command is inputted subsequently to a first gear change command during engaging operation of clutch 40, reception permission determination section 11i determines whether or not to receive the next gear change command and perform gear change control according to the gear change command according to the difference between current transmission torque Tpre and post-completion transmission torque Tfin, that is, the torque deviation (Tfin−Tpre). Specifically, reception permission determination section 11i determines whether or not the torque deviation (Tfin−Tpre) satisfies a predetermined condition (hereinafter referred to as reception permission condition).

The reception permission condition herein is that the torque deviation (Tfin−Tpre) is less than a predetermined value (hereinafter referred to as reception permission torque deviation (for example, a value close to zero)), for example. Alternatively, the reception permission condition may be that the torque deviation (Tfin−Tpre) is continuously less than the reception permission torque deviation for a predetermined time (hereinafter referred to as reception permission condition time) or more during engaging operation of clutch 40.

Different reception permission conditions may be adopted depending on whether the gear change command inputted during engaging operation of clutch 40 is a gear change command for a shift-up or a gear change command for a shift-down. For example, the reception permission condition time adopted for a shift-down may be longer than that adopted for a shift-up. This extends the time for which the rider senses deceleration at the shift gear corresponding to the first gear change command at a shift-down compared to a shift-up, thereby improving riding comfort of the vehicle at gear changes.

When current transmission torque Tpre and post-completion transmission torque Tfin satisfy the reception permission condition, reception permission determination section 11i stores in storage unit 12 information indicating that the start of gear change control according to the gear change command inputted subsequently is allowed even during execution of gear change control according to the first gear change command. For example, reception permission determination section 11i sets a flag (hereinafter referred to as permission flag) on indicating that the start of gear change control is allowed. In this case, reception permission determination section 11i sets the permission flag off when current transmission torque Tpre and post-completion transmission torque Tfin do not satisfy the reception permission condition any more.

When a first gear change command is inputted and gear change control is started, reception permission determination section 11i may store in storage unit 12 information indicating that reception of a next gear change command is restricted. For example, reception permission determination section 11i may set a flag (hereinafter referred to as prohibition flag) on indicating that reception of a gear change command is restricted. In this case, reception permission determination section 11i sets the prohibition flag off when current transmission torque Tpre and post-completion transmission torque Tfin have come to satisfy the reception permission condition.

Figure 7:
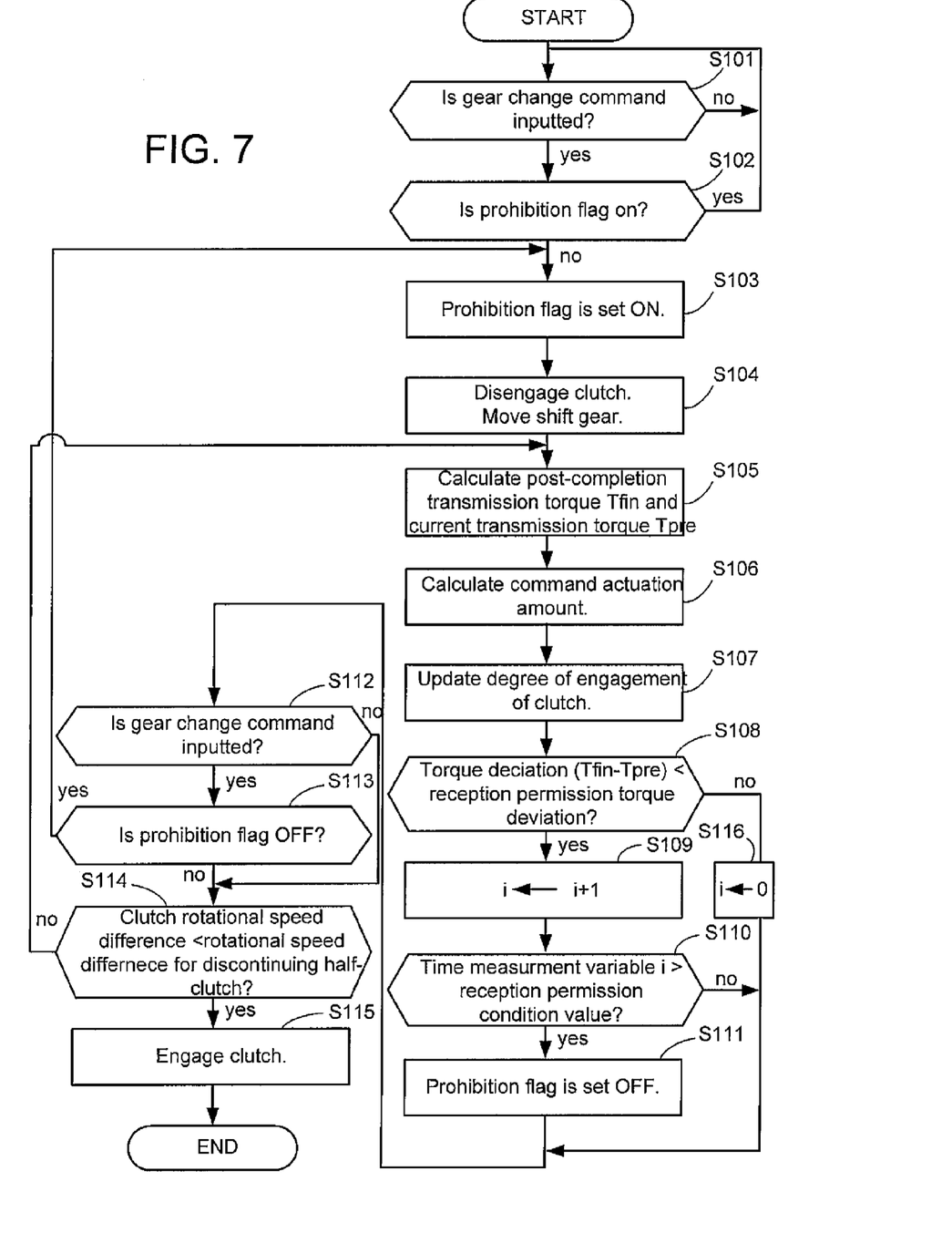
FIG. 7 is a flowchart showing processing executed by the control unit.

The flow of processing executed by control unit 11 is now described. FIG. 7 is a flowchart showing an example of processing executed by control unit 11. Reception permission determination section 11i measures the elapsed time since the torque deviation (Tfin−Tpre) becomes less than the reception permission torque deviation using a variable i (hereinafter referred to as time measurement variable) that increments by one in each sampling cycle of current transmission torque Tpre. Time measurement variable i is initially set to zero. In this example, when current transmission torque Tpre and post-completion transmission torque Tfin do not satisfy the reception permission condition described above, storage unit 12 stores the prohibition flag indicating that reception of a next gear change command is restricted.

Reception permission determination section 11i first determines whether or not a gear change command is inputted from shift-up switch 9a or shift-down switch 9b (S101). If a gear change command is not inputted, control unit 11 waits for a gear change command. On the other hand, if a gear change command is inputted, reception permission determination section 11i determines whether or not the prohibition flag is set on (S102). If the prohibition flag is set on, reception permission determination section 11i returns to S101. If the prohibition flag is set off, reception permission determination section 11i sets on the prohibition flag (S103). In addition, clutch actuator control section 11g actuates clutch actuator 14 to disengage clutch 40, and shift actuator control section 11h moves some of the shift gears 53a, 53b, 54a, 54b corresponding to the gear change command after detecting that clutch 40 has been disengaged (S104).

Next, post-completion torque obtaining section 11d calculates post-completion transmission torque Tfin, and current torque obtaining section 11a calculates current transmission torque Tpre (S105). Clutch actuator control section 11g then substitutes the torque deviation (Tfin−Tpre) into the engagement or disengagement actuation amount relational expression described above (see FIG. 5 or 6) to calculate the command actuation amount for clutch actuator 14 (S106). As described above, if the clutch rotational speed difference is positive (if the rotational speed of drive-side member 41 is more than that of driven-side member 42), clutch actuator control section 11g substitutes the torque deviation (Tfin−Tpre) into the engagement actuation amount relational expression. If the clutch rotational speed difference is negative (if the rotational speed of drive-side member 41 is less than that of driven-side member 42), clutch actuator control section 11g substitutes the torque deviation (Tfin−Tpre) into the disengagement actuation amount relational expression. Clutch actuator control section 11g outputs a control signal to clutch actuator drive circuit 13 according to the command actuation amount to change the degree of engagement of clutch 40 (step S107). This brings clutch 40 into a half-clutch state, in which the degree of engagement is gradually changed.

Reception permission determination section 11i next performs processing for determining whether or not the reception permission condition is satisfied. Specifically, reception permission determination section 11i first determines whether or not the torque deviation (Tfin−Tpre) is less than the reception permission torque deviation (S108). If the torque deviation (Tfin−Tpre) is less than the reception permission torque deviation, reception permission determination section 11i increments time measurement variable i (S109), and determines whether or not time measurement variable i exceeds a predetermined value (hereinafter referred to as reception permission condition value) (S110). If time measurement variable i has already exceeded the reception permission condition value, reception permission determination section 11i judges that the torque deviation (Tfin−Tpre) has continuously been less than the reception permission torque deviation for the reception permission condition time described above or more, and sets the prohibition flag off in storage unit 12 (S111). Reception permission determination section 11i then determines whether or not a next gear change command is inputted (S112).

On the other hand, if the torque deviation (Tfin−Tpre) is not less than the reception permission torque deviation in S108, the reception permission condition is not satisfied. Therefore, reception permission determination section 11i resets time measurement variable i to zero (S116), and proceeds to the processing in S112 without setting the prohibition flag off in storage unit 12. If time measurement variable i has not exceeded the reception permission condition value yet in S110, the reception permission condition is not satisfied. Therefore, reception permission determination section 11i proceeds to the processing in S112 without setting the prohibition flag off.

If a next gear change command is not inputted in S112, clutch actuator control section 11g calculates the clutch rotational speed difference, and determines whether or not the calculated rotational speed difference is less than the rotational speed difference for discontinuing half-clutch (step S114). If the clutch rotational speed difference is less than the rotational speed difference for discontinuing half-clutch, clutch actuator control section 11g completely engages drive-side member 41 and driven-side member 42, and discontinues the half-clutch state (S115), to complete the gear change control.

On the other hand, if a gear change command is inputted in S112 even during engaging operation of clutch 40, the reception permission determination section 11i determines whether or not the prohibition flag in storage unit 12 is set off (S113). If the prohibition flag in storage unit 12 is still set on, the operating state of the vehicle (the degree of engagement of clutch 40) is not suitable to start gear change control according to the gear change command inputted in S112. Therefore, control unit 11 proceeds to the processing in S114 without responding to the gear change command. On the other hand, if the prohibition flag in storage unit 12 is set off in S113, control unit 11 returns to the processing in S103 to start gear change control according to the gear change command. Control unit 11 repeats the above processing in a predetermined cycle (for example, several milliseconds) until the half-clutch state is discontinued in S115. The aforementioned processing is an example of processing executed by control unit 11 at gear changes.

Figure 8:
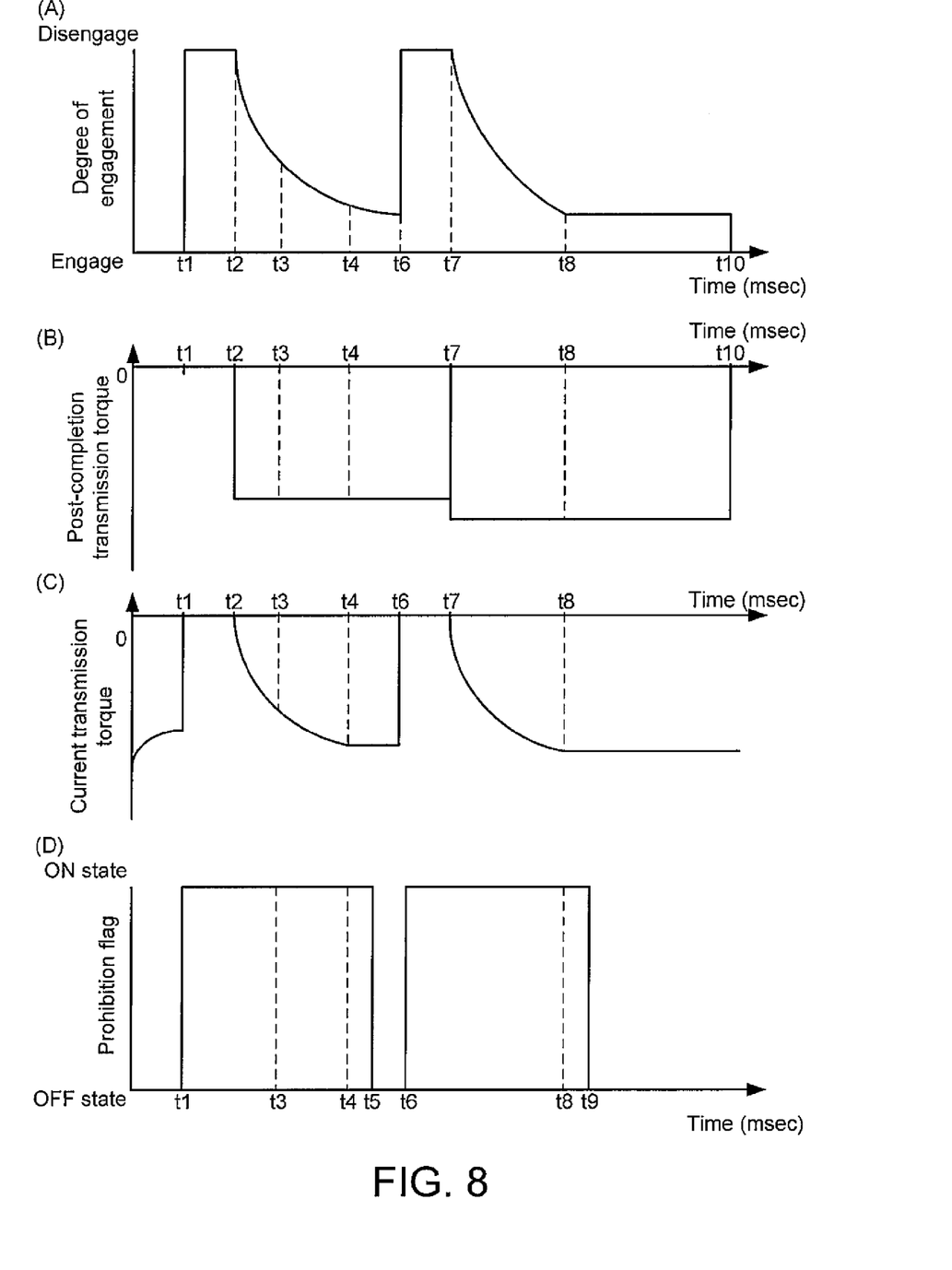
FIG. 8(a) shows changes over time in the degree of engagement of a clutch.
FIG. 8(b) shows changes over time in the post-completion transmission torque.
FIG. 8(c) shows changes over time in the current transmission torque.
FIG. 8(d) shows changes over time in the ON/OFF state of a prohibition flag.

The results of the processing executed by control unit 11 are now described. FIG. 8 is a time chart showing examples of the results of processing executed at gear changes, wherein FIG. 8(a) shows changes over time in the degree of engagement of clutch 40, FIG. 8(b) shows changes over time in post-completion transmission torque Tfin, FIG. 8(c) shows changes over time in current transmission torque Tpre, and FIG. 8(d) shows the ON/OFF state of the prohibition flag. In the example to be described, the rider commands a shift-down, and an engine brake is applied, that is, current transmission torque Tpre transmitted from drive-side member 41 to driven-side member 42 of clutch 40 is negative. Also, in the example to be described, a shift-down is commanded twice during engaging operation of clutch 40.

When a signal to command a gear change is inputted from shift-down switch 9b at time t1, clutch actuator control section 11g executes processing to disengage clutch 40 as shown in FIG. 8(a). At this time, reception permission determination section 11i executes processing to set the prohibition flag on as shown in FIG. 8(d). In addition, current transmission torque Tpre transmitted from drive-side member 41 to driven-side member 42 of clutch 40 becomes zero as shown in FIG. 8(c).

When some of the shift gears 53a, 53b, 54a, 54b have completely been moved in the processing executed by shift actuator control section 11h at time t2, torque estimated to be transmitted to driven-side member 42 after completion of engaging operation of clutch 40 (when drive-side member 41 and driven-side member 42 have completely been engaged) corresponding to the first gear change command (the gear change command inputted at time t1) is set as post-completion transmission torque Tfin in processing executed by post-completion torque obtaining section 11d, as shown in FIG. 8(b). Clutch actuator control section 11g then executes processing to actuate clutch actuator 14 according to the difference between post-completion transmission torque Tfin and current transmission torque Tpre, in order to bring clutch 40 into a half-clutch state as shown in FIG. 8(a). The difference between current transmission torque Tpre being transmitted to drive-side member 42 and post-completion transmission torque Tfin becomes gradually smaller as shown in FIGS. 8(b) and 8(c).

when another gear change command is inputted at time t3, gear change control corresponding to this gear change command is not started at this time because the prohibition flag is still set on as shown in FIG. 8(d). When current transmission torque Tpre reaches post-completion transmission torque Tfin at time t4, and the torque deviation, or the difference between them, becomes less than reception permission torque deviation, reception permission determination section 11i measures the time since the torque deviation becomes less than the reception permission torque deviation. Then, when it is judged that the elapsed time has become the reception permission condition time or more at time t5, the prohibition flag is set off as shown in FIG. 8(d). Since current transmission torque Tpre has reached post-completion transmission torque Tfin at time T4, the rider can sense deceleration at the shift gear corresponding to the gear change command inputted first (the command inputted at time t1) after time t4.

When a gear change command is inputted again at time t6, gear change control corresponding to the gear change command is started since the prohibition flag is set off. As a result, clutch actuator control section 11g disengages clutch 40 again as shown in FIG. 8(a), and current transmission torque Tpre becomes zero again as shown in FIG. 8(c). Also, at this time, reception permission determination section 11i sets the prohibition flag on again as shown in FIG. 8(d).

When some of the shift gears 53a, 53b, 54a, 54b have completely been moved at time t7, post-completion torque obtaining section 11d sets post-completion transmission torque Tfin estimated to be transmitted via clutch 40 after completion of engagement of clutch 40 (at time t10 in FIG. 8), as shown in FIG. 8(b). Clutch actuator control section 11g then executes processing to actuate clutch actuator 14 according to the difference between current transmission torque Tpre and post-completion transmission torque Tfin, in order to bring clutch 40 closer to an engaged state. When accelerator displacement has been varied during the gear change control, a post-completion transmission torque Tfin different from that set when the first gear change command is inputted is set at time t7, as shown in FIG. 8(b). After that, clutch 40 is brought into a half-clutch state as shown in FIG. 8(a), and the difference between current transmission torque Tpre and post-completion transmission torque Tfin becomes gradually smaller as shown in FIGS. 8(b) and 8(c).

When current transmission torque Tpre reaches post-completion transmission torque Tfin at time t8, and the torque deviation becomes less than reception permission torque deviation, reception permission determination section 11i measures the elapsed time since time t8. When the elapsed time since time t8 exceeds the reception permission condition time at time t9, reception permission determination section 11i executes the processing to set the prohibition flag off again as shown in FIG. 8(d). If current transmission torque Tpre and post-completion transmission torque Tfin coincide with each other at time t8, the degree of engagement of clutch 40 is maintained thereafter as shown in FIG. 8(a).

When the clutch rotational speed difference becomes less than the rotational speed difference for discontinuing half-clutch at time t10, clutch actuator control section 11g completely engages drive-side member 41 and driven-side member 42. Gear change control by control unit 11 is thus finished.

In gear change control device 10 described above, after a first gear change command is inputted, a next gear change command is received according to the difference between current transmission torque Tpre and post-completion transmission torque Tfin. This allows the rider to sense deceleration and acceleration that will occur after completion of engagement of clutch 40, even before clutch 40 is completely engaged. Gear change control device 10 can then receive the next gear change command after the rider senses deceleration or acceleration at the shift gear corresponding to the first gear change command. As a result, riding comfort is improved by reducing the occurrence of deceleration and acceleration exceeding the expectation of the rider. For example, the rider can sense deceleration and acceleration at the shift gear corresponding to the gear change command inputted first, to judge the necessity for another gear change and expect deceleration and acceleration at another gear change. Consequently, riding comfort is improved by reducing the occurrence of deceleration and acceleration exceeding the expectation of the rider.

In addition, in gear change control device 10, current torque obtaining section 11a calculates current transmission torque Tpre based on EG torque TEpre being outputted from engine 30 and inertia torque TIpre of the mechanism upstream of drive-side member 41 in the torque transmission path. This allows calculation of current transmission torque Tpre by simple processing without using a sensor for directly detecting torque or the like.

Further, in gear change control device 10, post-completion torque obtaining section 11d estimates post-completion EG torque TEfin to be outputted from engine 30 after completion of engagement of clutch 40 and post-completion inertia torque TIfin of the mechanism upstream of drive-side member 41 after completion of engagement of clutch 40, and calculates post-completion transmission torque Tfin based on the estimated EG torque TEfin and the estimated post-completion inertia torque TIfin. This allows calculation of current transmission torque Tpre by simple processing. Gear change control device 10 may also execute the processing described above when gear change commands for a shift-up are successively inputted, for example, rather than when gear change commands for a shift-down are inputted as in the example described herein.

Moreover, in gear change control device 10, control unit 11 starts receiving a next gear change command according to the time when the difference between current transmission torque Tpre and post-completion transmission torque Tfin becomes a predetermined value (in the above description referred to as reception permission torque deviation) or less. This allows the rider to sense deceleration and acceleration that will occur after completion of engagement of clutch 40, even before clutch 40 is completely engaged, by setting the reception permission torque deviation to a small value, for example. Gear change control device 10 then receives the next gear change command after the rider senses deceleration or acceleration at the shift gear corresponding to the first gear change command. As a result, riding comfort is improved by reducing the occurrence of deceleration and acceleration exceeding the expectation of the rider.

The present invention is not limited to the embodiments of gear change control device 10 and motorcycle 1 described above, and can be modified variously. For example, although motorcycle 1 is provided with engine 30 as a driving source, the driving source may be an electric motor or a hybrid engine combining an electric motor and an engine.

In addition, in the above description, gear change control device 10 and clutch 40 are applied to motorcycle 1. However, the gear change control device described above may be applied to other vehicles such as an automobile.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A gear change control device comprising:
   a clutch actuator for changing a degree of engagement of a clutch;
   a current torque obtaining section for obtaining torque transmitted from a drive-side member of the clutch to a downstream mechanism in a torque transmission path as current torque, the downstream mechanism including a driven-side member of the clutch;
   a post-completion torque obtaining section for obtaining torque estimated to be transmitted from the drive-side member to the downstream mechanism after completion of engagement of the clutch as post-completion torque; and
   a control unit for disengaging the clutch by actuating the clutch actuator and changing shift gears in response to a gear change command by a rider, and then controlling a degree of engagement of the clutch according to a difference between the current torque and the post-completion torque,
   wherein the control unit receives a next gear change command according to the difference between the current torque and the post-completion torque.

2. The gear change control device according to claim 1, wherein the current torque obtaining section calculates the current torque based on torque outputted from a power source and inertia torque of a mechanism upstream of the drive-side member in the torque transmission path.

3. The gear change control device according to claim 1, wherein the post-completion torque obtaining section estimates torque outputted from a power source after completion of engagement of the clutch and inertia torque of a mechanism upstream of the drive-side member after completion of engagement of the clutch, and calculates the post-completion torque based on the estimated torque and the estimated inertia torque.

4. The gear change control device according to claim 1, wherein the control unit starts receiving the next gear change command according to a time when the difference between the current torque and the post-completion torque becomes a predetermined value or less.

5. A straddle-type vehicle comprising the gear change control device according to claim 1.

6. A method of controlling a gearbox, comprising:
   disengaging a clutch by actuating a clutch actuator and changing shift gears in response to a gear change command by a rider;
   obtaining torque transmitted from a drive-side member of the clutch to a downstream mechanism in a torque transmission path as current torque, the downstream mechanism including a driven-side member of the clutch;
   obtaining torque estimated to be transmitted from the drive-side member to the downstream mechanism after completion of engagement of the clutch as post-completion torque;
   controlling a degree of engagement of the clutch according to a difference between the current torque and the post-completion torque; and
   starting to receive a next gear change command according to the difference between the current torque and the post-completion torque.

* * * * *